Figure 1:
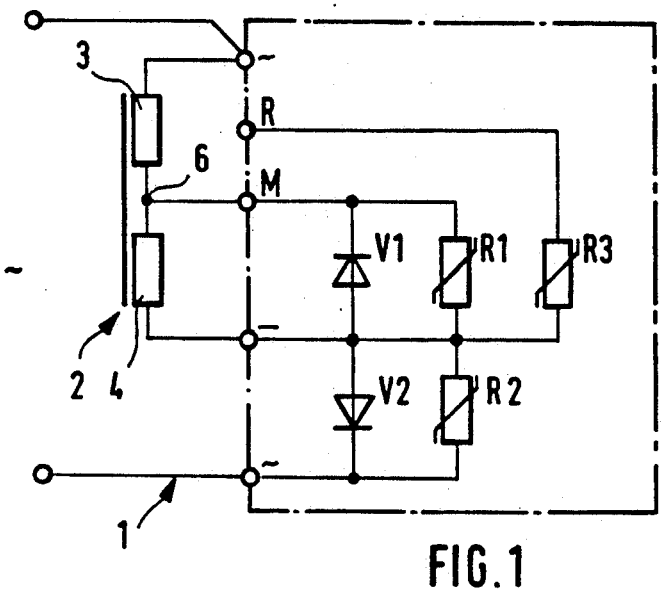

United States Patent [19]
Trümpler et al.

[11] Patent Number: 5,278,483
[45] Date of Patent: Jan. 11, 1994

[54] MOTOR BRAKE WITH SINGLE FREE WHEELING DIODE CONNECTED IN PARALLEL WITH ONLY ONE PARTIAL COIL OF BRAKE MAGNET COIL

[75] Inventors: Walter Trümpler, Karlsruhe; Josef Schmidt, Graben-Neudorf, both of Fed. Rep. of Germany

[73] Assignee: Sew-Eurodrive GmbH & Co., Bruchsal

[21] Appl. No.: 972,905

[22] Filed: Nov. 6, 1992

Related U.S. Application Data

[63] Continuation of Ser. No. 688,264, Apr. 22, 1991, abandoned, which is a continuation of Ser. No. 39,749, Apr. 20, 1987, abandoned.

[30] Foreign Application Priority Data

Apr. 19, 1986 [DE] Fed. Rep. of Germany ....... 3613294

[51] Int. Cl.$^5$ ............................................... H02P 3/00
[52] U.S. Cl. ........................................ 318/756; 318/89
[58] Field of Search ................. 318/759, 89, 756, 762, 318/766; 361/154, 194

[56] References Cited

U.S. PATENT DOCUMENTS

| | | | |
|---|---|---|---|
| 3,614,565 | 10/1971 | Mierendorf | 188/161 |
| 3,666,998 | 5/1972 | Wielebski | 361/154 |
| 3,737,736 | 6/1973 | Stampfli | 361/154 |
| 4,065,096 | 12/1977 | Frantz et al. | 335/256 |
| 4,114,184 | 9/1978 | Stampfli | 361/154 |
| 4,227,231 | 10/1980 | Hansen et al. | 361/154 |
| 4,355,267 | 10/1982 | Franz, Jr. et al. | 318/89 |
| 4,380,724 | 4/1983 | Franz, Jr. et al. | 318/89 |

*Primary Examiner*—Jonathan Wysocki
*Attorney, Agent, or Firm*—Antonelli, Terry, Stout & Kraus

[57] ABSTRACT

A brake for a motor, particularly an alternating current motor with an electromagnetic brake is proposed for improving dynamic characteristics without increasing power loss, in which a brake magnet coil is subdivided at an intermediate tap into two partial coils, one of which is arranged in a freewheeling circuit.

9 Claims, 6 Drawing Sheets

MOTOR BRAKE WITH SINGLE FREE WHEELING DIODE CONNECTED IN PARALLEL WITH ONLY ONE PARTIAL COIL OF BRAKE MAGNET COIL

This is a continuation of application Ser. No. 688,264 filed on Apr. 22, 1991, which is a continuation of application Ser. No. 039,749 filed on Apr. 20, 1987, now abandoned.

The invention relates to a brake for a motor, particularly an alternating current motor with an electromagnetic brake including a brake magnet coil and a rectifier circuit. In such an electromagnetic brake, in which an armature disk or plate is generally moved counter to the tension of springs upon switching on the brake magnet coil, high magnetomotive forces or potential differences must be built up upon switching on in order to move the armature disk and in particular to achieve a momentary response or operation of the brake. Following the application of the brake the air gap between the armature disk and the brake magnet coil becomes smaller and consequently the magnetic resistance is reduced, so that lower potential differences and therefore lower holding currents are required for maintaining the brake.

It has already been proposed (U.S. Pat. No. 3,614,565) to initially subject the brake magnet coil for a short time following the switching on of the motor current to the action of a high voltage and therefore a correspondingly high current and then to reduce the current through the brake magnet coil by means of a control circuit to a lower holding value. This can be more rapidly decreased following disconnection, so that the brake can be quickly released again.

The object of the present invention is to further develop a brake according to this type, such that the dynamic characteristics can be improved in a simple manner.

In the case of a brake with a brake magnet coil and a rectifier circuit, this problem is inventively solved in that the brake magnet coil is subdivided by an intermediate tap into two partial coils, one of which is located in a freewheeling circuit. The dynamic characteristics of the brake are improved in that the freewheeling circuit of the brake magnet coil is only formed by a partial coil thereof.

As a result of the inventive brake construction the dynamic characteristics of a brake are improved and the brake can be constructed more cost-efficiently, because less copper has to be used for the winding, less iron for the armature and also less expensive iron can be used, which more than compensates for the slightly increased costs of the switching electronics, which merely switch one coil into and out of the circuit. As a result of the inventive construction, the brake is subject to less wear and has a higher brake lining life, because the lining becomes less worn due to the rapid application of the brake through the high starting current in the case of electromagnetic production of the operating force. The short starting time is attained by the small time constant of the accelerator coil. A high current flows a long distance in a short time, but because of the smaller number of turns the current does not cause over-saturation. In addition, during starting, the motor is heated less due to the rapid release of the brake.

According to the present invention, in order to switch the branches or partial coils of the brake magnet coil, one partial coil serving as the accelerating coil is in series with a switch which is in parallel to the other partial coil and which can be switched by an associated control element. This further development provides the possibility of applying the voltage to only one part of the brake magnet coil during the switching on of the brake and consequently the current only flows through one part of the brake magnet coil with a value adequate for applying the armature disk, whereas for maintaining purposes the voltage decreases over the entire brake magnet coil, so that as a result of the increased resistance there is automatically a lower holding current. The control element is preferably constructed as a time switch, to which is also connected in series one of the partial coils as a dropping resistor.

For as long as the switch, which is preferably constructed as an electronic switch, such as thyristor is connected, the rectified current flows across one brake magnet coil part, namely the accelerating coil part, as well as the thyristor. Blocking the thyristor leads to a current flow through both partial coils and the increased resistance reduces the current flowing. On switching off the motor, accompanied by the application of the brake, a freewheeling circuit with a freewheeling diode can be associated in a conventional manner with the brake magnet coil or one of its branches in order to decrease the magnetic energy of the brake magnet coil following disconnection. In order to permit rapid application, the freewheeling circuit can be made to have a high impedance in that an electronic switch is blocked, so that following disconnection the current flows across a resistor arranged in parallel to the switch and e.g. a varistor. The latter switch has hitherto been switched in known manner by the voltage at the motor. Following the disconnection of the motor, the latter produces a generator voltage, which delays the blocking of said switch.

In order to obtain immediate switching and therefore an improvement to the dynamic behavior of the brake, even on disconnecting the motor and on applying the brake, according to a preferred development it is proposed that a current transformer is located in the brake motor power supply and is connected to a control circuit for a switch arranged in the brake magnet coil circuit. Thus, according to the invention, for switching the brake magnet coil the motor current and not the voltage is used as the control signal for opening the freewheeling circuit of the brake magnet coil. Unlike the voltage, said motor current is also interrupted immediately after interrupting the supply to the motor, e.g. by switching a contactor, so that the disconnection times are further reduced. According to the further development, the control circuit has a Schmitt trigger circuit, and a diode is associated with the circuit breaker is associated in antiparallel, which provides additional protection for the switch, particularly a field effect transistor, if polarities are confused in wiring.

As an alternative to the known direct current-side high impedance switching of the freewheeling circuit, the invention further proposes countercurrent energizing, so that a preferred embodiment of the invention is characterized in that with the freewheeling circuit is associated a counterenergizing branch with a switch for countercurrent application purposes. Thus, the residual induction voltage of the motor following the disconnection thereof is used to supply countercurrent to the brake. It is also pointed out that, should the motor have no residual voltage after disconnection, so that no countercurrent action can be provided, this would correspond to an a.c. voltage-side disconnection, in which the brake would in any case be rapidly applied due to its inventive construction. An a.c. voltage-side disconnection of a brake magnet coil supplied with direct current is known, but the switch for carrying out switching belongs to a contactor used for switching on and off the mains voltage, whereby it is disadvantages that a motor contactor must have an additional switch contact for the brake magnet coil and therefore additional connecting lines from the contactor to the circuit arrangement for the brake magnet coil, so that d.c. side disconnections have been proposed as a result of the residual voltage of the motor and which have the aforementioned disadvantages. According to a further development the invention proposes an a.c. side isolation in that when a switching signal across a current transformer located in the motor power supply, decreases, a switch is disconnected on the a.c. side in the power supply of the brake magnet coil. The switch is a circuit breaker and in particular a triac.

Further advantages and features of the invention can be gathered from the claims and the following description of preferred embodiments of the inventive brake with reference to the attached drawings, which show:

FIG. 1, a first embodiment of the invention.

Figure 2:
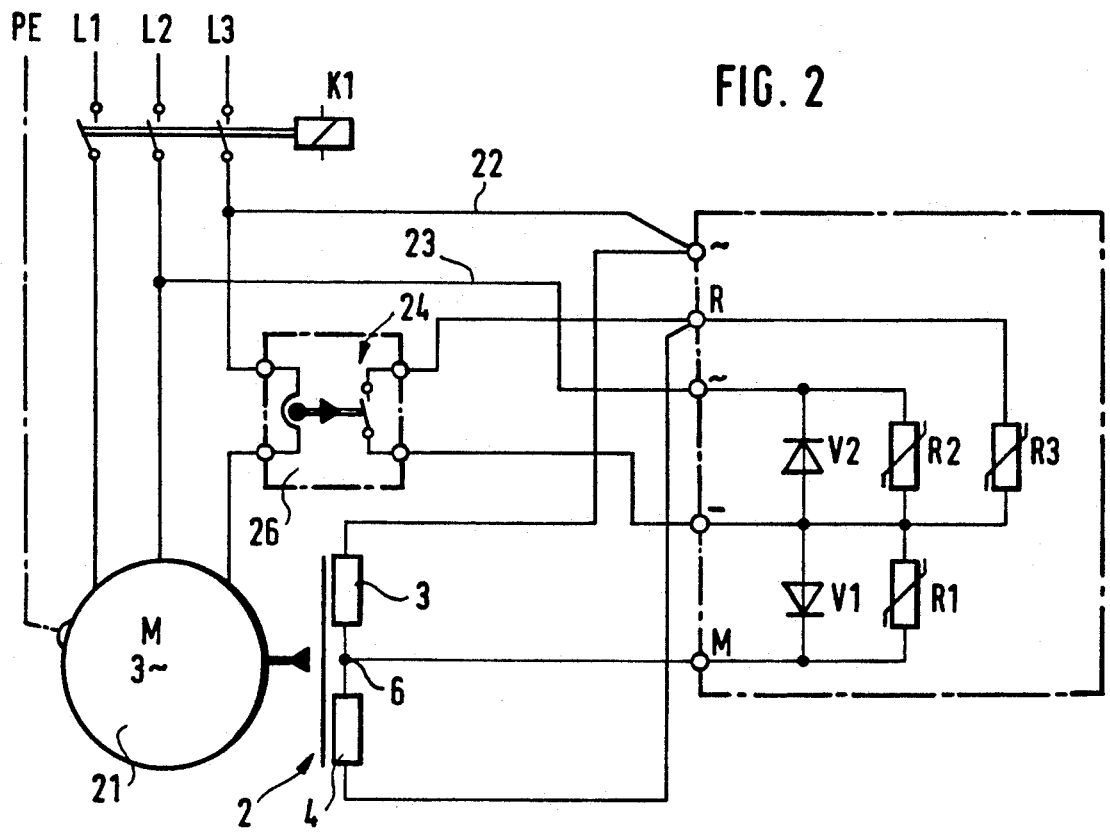

FIG. 2, a diagrammatic representation of a brake and a motor with the circuit according to FIG. 1.

Figure 3:
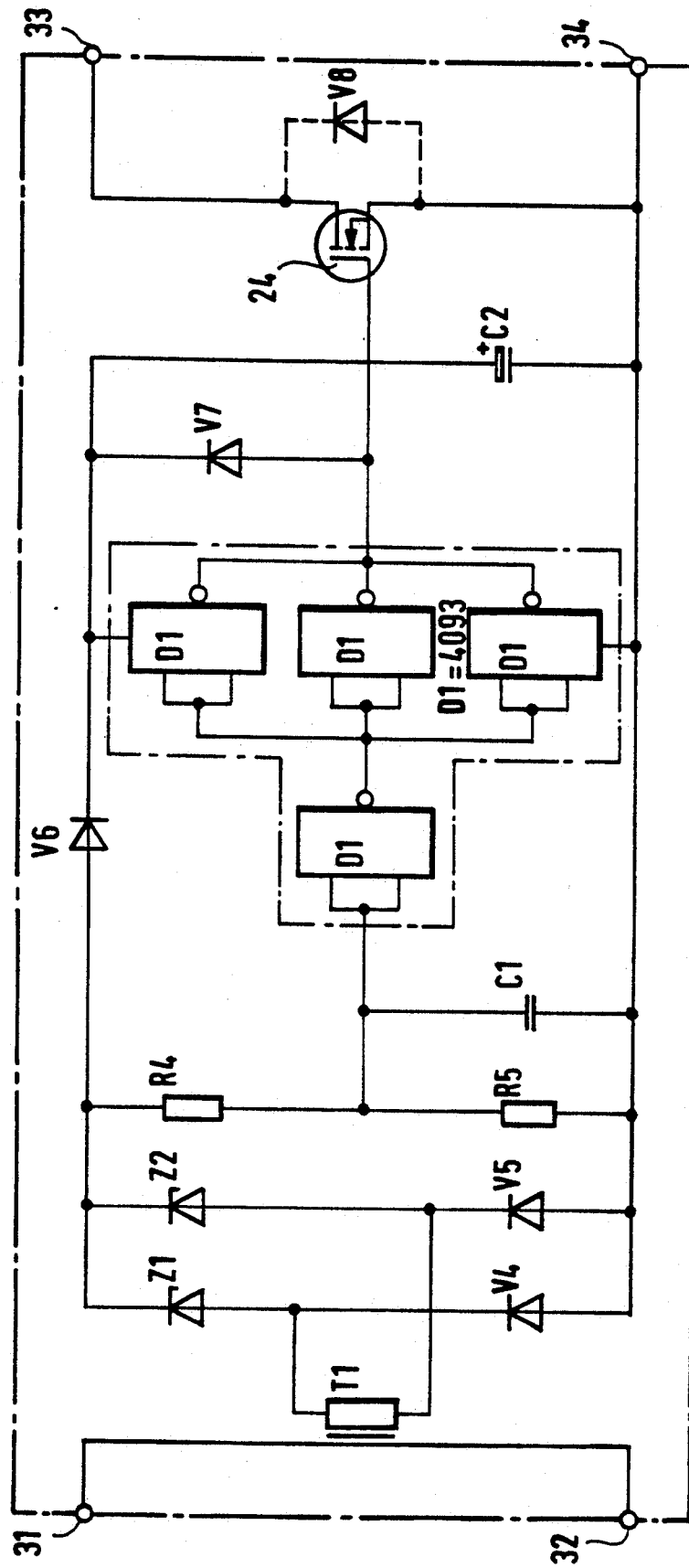

FIG. 3, a circuit for further improving the dynamics.

Figure 4:
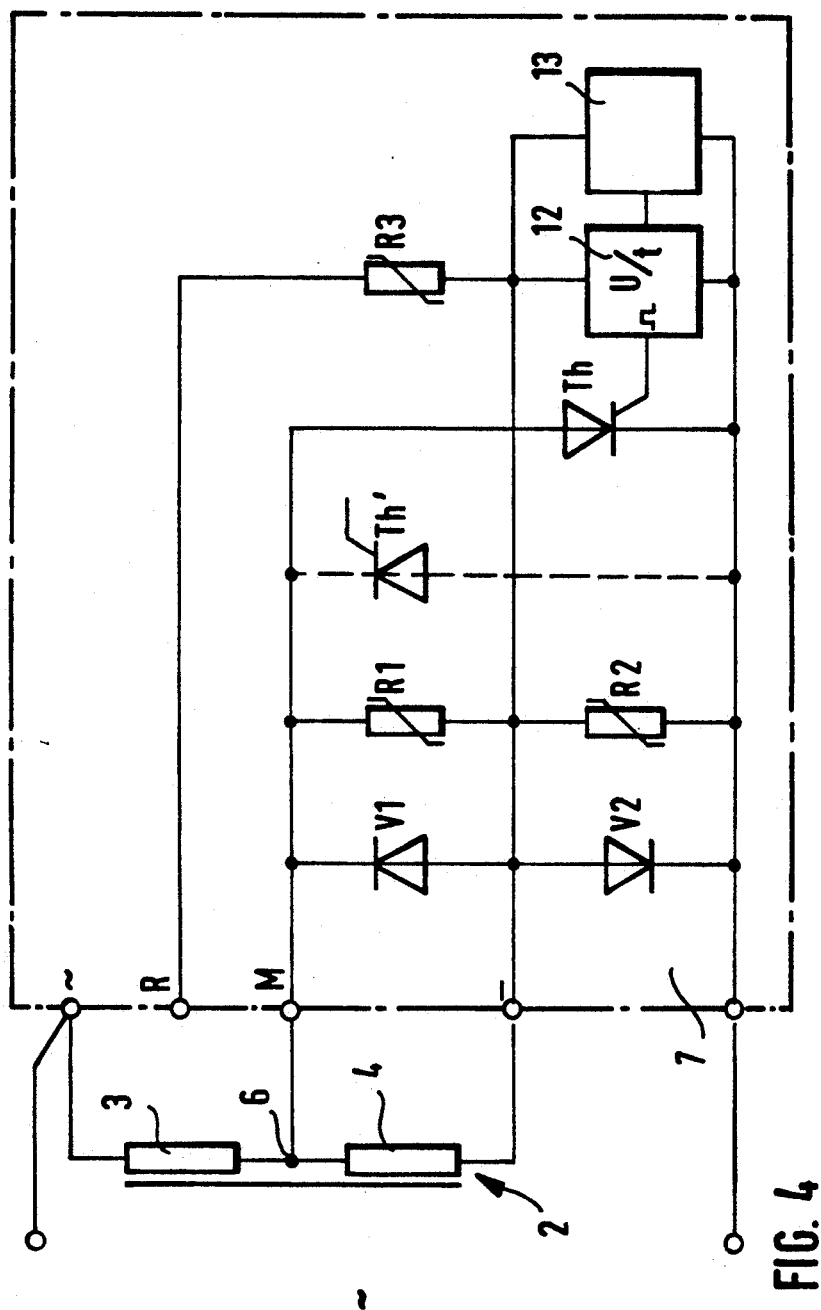

FIG. 4, another embodiment like that of FIG. 1 with better release dynamics by accelerator function.

Figure 4A:
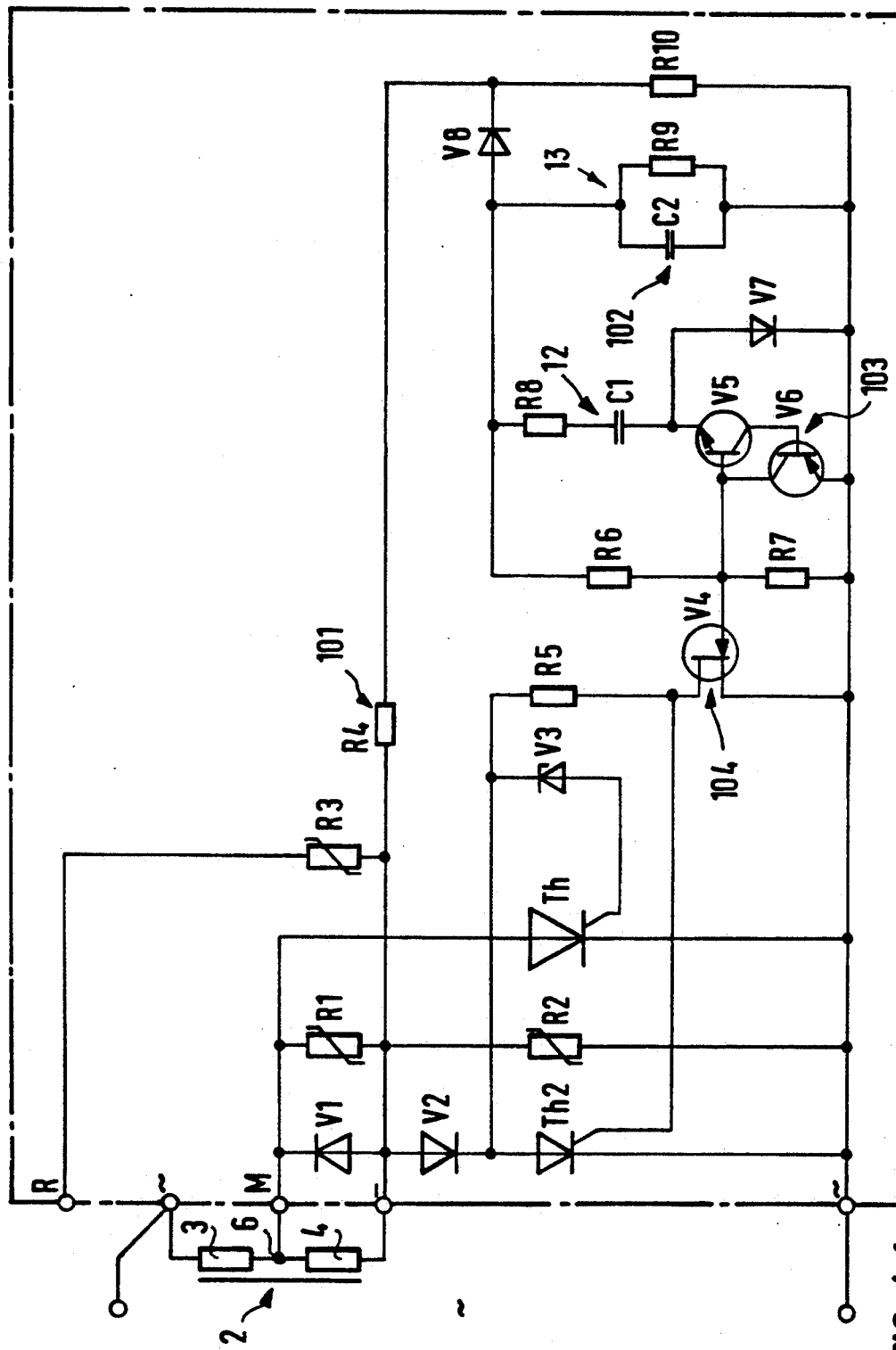

FIG. 4A, a specific circuit for controlling and monitoring of the embodiment of FIG. 4.

Figure 5:
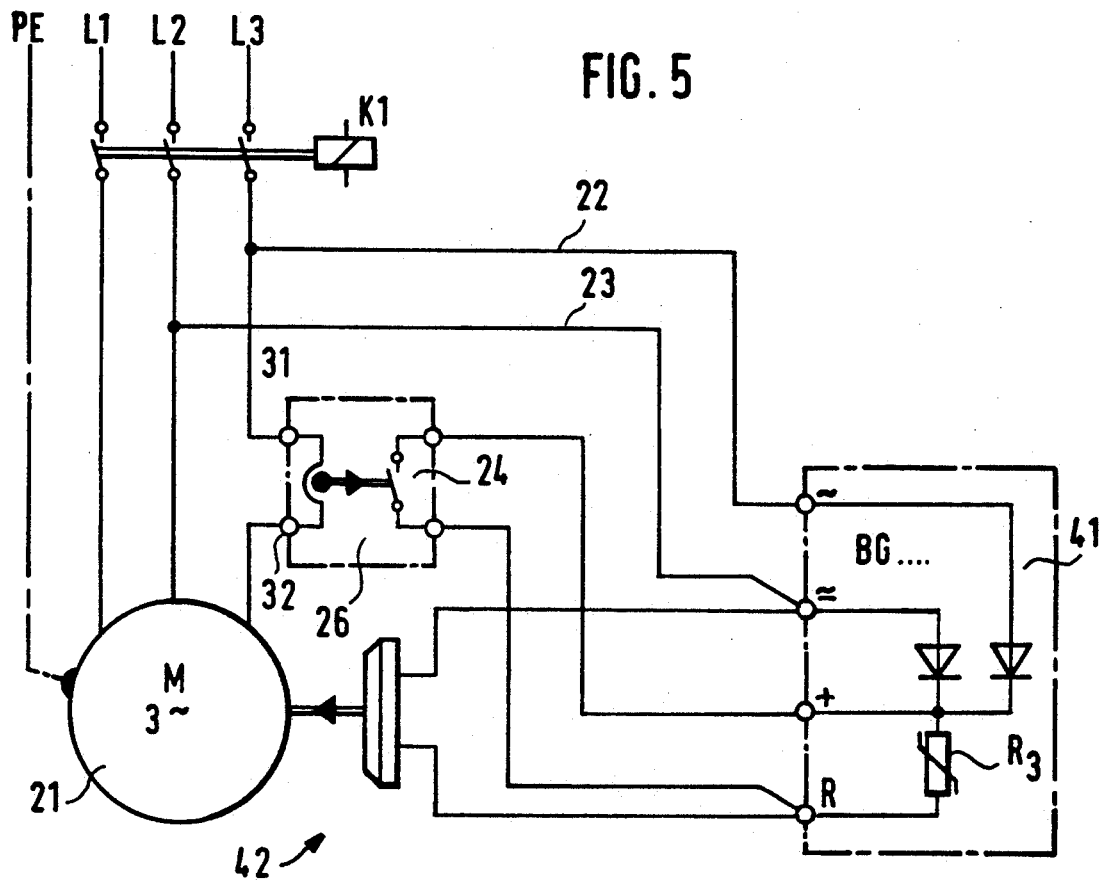

FIG. 5, another embodiment similar to that of FIG. 3.

Figure 6:
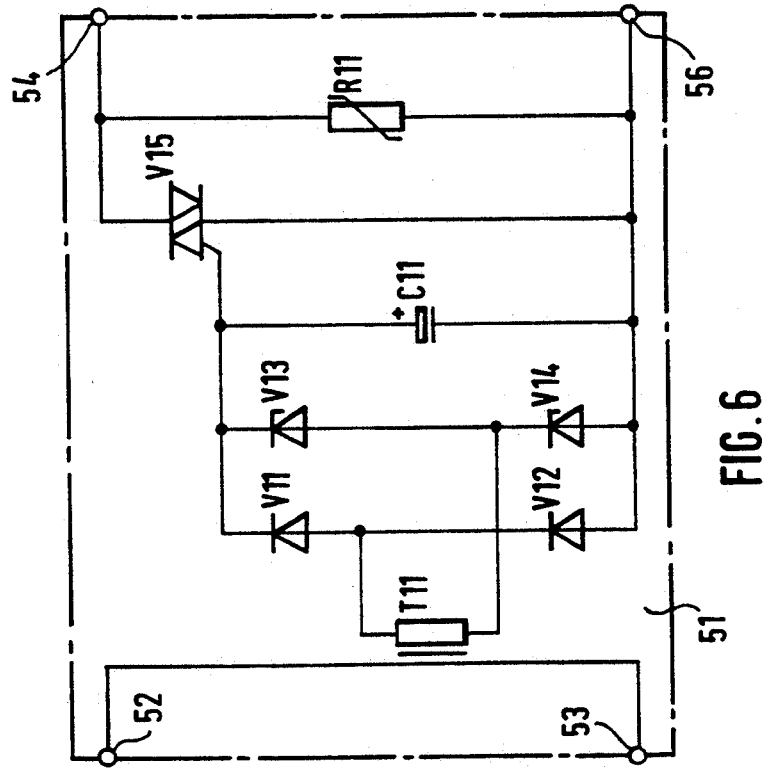

FIG. 6, an alternative to the circuit according to FIG. 3, particularly for the embodiment of FIG. 1.

Figure 7B:
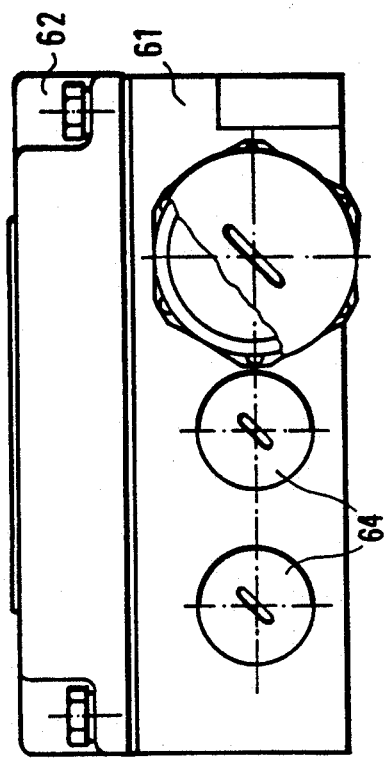
Figure 7A:
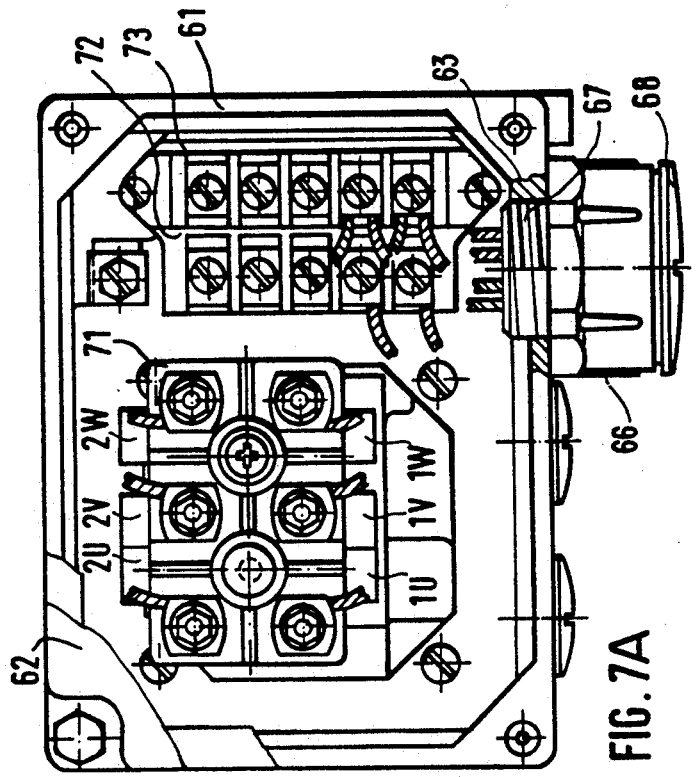

FIGS. 7A and 7B, a preferred fitting possibility for a switch according to FIGS. 3 or 6.

According to FIG. 2, the inventive brake 1 has a brake magnet coil 2 with two partial coils 3, 4, as is shown diagrammatically in FIG. 1. An intermediate tap 6 is provided between the two partial coils 3, 4. The brake magnet coil 2 is preferably constructed in such a way that the two partial coils are wound in a radially superimposed manner and are led out at an appropriate point of the intermediate tap. Partial coil 3 has approximately ½ to ⅓ of the resistance of partial coil 4. There is also a half-wave rectifier circuit 7 with two rectifier diodes V1, V2, whereof diode V1 is positioned parallel to partial coil 4 in the form of a freewheeling diode. Varistors R1 and R2 as overvoltage protection elements are connected in parallel to diodes V1, V2. There is finally a third varistor R3, which will be explained with reference to FIG. 2 and which on disconnecting the brake is in series with the high impedance freewheeling circuit of the brake magnet coil, as is shown by a comparison with FIG. 2.

The function of the embodiment of FIG. 1 is as follows. For one half-wave of the alternating current network, the current flows across both partial coils 3, 4 and diode V2. For the other half-wave diode V2 is blocked, while a freewheeling circuit is freed across diode V1 an across which the energy of the brake magnet coil is reduced. This in itself leads to an improvement in the dynamics of brake 1 compared with conventional brakes with the same production of heat and in particular the release time is reduced.

FIG. 2 shows a motor 21 to be braked with connections L1, L2, L3 for phases R, S, T of an a.c. voltage network. In connection lines L1, L2, L3 is provided a motor contactor K1, via which the motor 21 can be connected to the mains. From two connections, in this case L2, L3, leads 22, 23 pass to the brake of FIG. 1. The freewheeling circuit of brake magnet coil 2 also contains a switch 24 switchable by the disconnection of the mains via contactor K1. Switch 24 can be switched in a known manner by the voltage drop on switching off the motor across the contactor K1, or by the control circuit 26 described relative to FIG. 3 by a motor current in the manner represented in FIG. 2. Switch 24 is shunted by varistor R3 contained in FIG. 1. With the disconnection of motor 21 from the mains, via contactor K1, the switch 24 shunted by varistor R3 is opened and consequently the freewheeling current flowing across the freewheeling diode V1 is reduced to a value limited by varistor R3, resulting in an even faster application of brake 1.

As stated, according to the invention, switch 24 in the freewheeling circuit of the brake magnet coil 2 forms part of a control circuit 26, as shown in FIG. 3. Circuit 26 of FIG. 3 is preferably constructed as an additional device in a separate casing. The casing can be designed in the manner described with reference to FIGS. 7A and 7B.

The additional device with circuit 26 has four leads. With two leads 31, 32 it is connected into one of the connecting lines of the motor and in the embodiment according to FIG. 2 into line L3. Circuit 26 has as an essential element a current transformer T1, so that it deals with the motor current and not the voltage applied to motor 21. The additional device is switched in the freewheeling circuit of the brake magnet coil 2 by output terminals 33, 34 associated with electronic switch 24, which is a field effect transistor (FET) in the represented embodiment. To switch 24 can be connected an antiparallel-associated diode V8, in order to provide further protection if polarities are confused during wiring. A field effect transistor (FET) already includes such a diode (as a parasitic element). Control circuit 26 has a bridge rectifier 237 with two diodes V4, V5 and two zener diodes Z1, Z2 (the latter for voltage limitation purposes), as well as a Schmitt trigger D1, which is formed by a correspondingly wired IC 4093. A filter R4, R5, C1 is provided in order to filter out the ripple of the signal of current transformer T1 rectified by the rectifier. Schmitt trigger D1 is supplied by means of diode V6 and capacitor C2 ensuring that there is always an adequate supply voltage for the Schmitt trigger. V7 is a protection diode. If the motor is now switched off, in that contactor K1 is opened, then leads 22, 23 of brake 1 (FIG. 2) become dead, so that the brake should be released. However, such a rapid release is delayed by the generator voltage produced on disconnecting the motor. In addition, a freewheeling current is formed in the brake magnet coil on disconnection and delays the application of brake 1. On disconnecting the motor across contactor K1, the power supply in leads L1 to L3 is immediately interrupted, so that via the control circuit 26 in lead L3, on dropping below the lower breakover voltage of the Schmitt trigger, switch 24 is immediately transferred into the blocked state, so that (FIG. 2) the freewheeling current of brake magnet coil 2 must flow against the varistor impedance and the magnetic energy is withdrawn from the brake system, which makes the brake be applied even faster.

As soon as the motor is switched on again, i.e. is connected to the mains and consequently current flows, switch 24 is again turned on.

FIG. 4 shows another embodiment of the inventive brake. This construction is based on FIG. 1, so that reference should be made thereto in connection with coinciding features. A thyristor Th is connected to the intermediate tap 6 and in series with partial coil 3, so that the latter can be switched as an accelerating coil. The thyristor Th is switched and in particular started by a time switch 12, which has an RC network which applies the starting signal for a desired time to thyristor Th. A monitoring unit 13 is provided for retriggering time switch 12 in the case of undervoltages, the use of said unit being a function of the dimensioning of the brake and will be explained in further detail hereinafter. Unit 13 operates in a preferred manner according to the principle of relative voltage measurement, so that the function thereof is independent of the supply voltage. Compared with the construction according to FIG. 1, the dimensioning of the brake magnet coil 2 made up of the partial coils 3, 4 is such that without switching the current flowing through the entire brake magnet coil 2, it is no longer possible to apply the brake. Thus, in this construction, the same brake magnet coil as in FIG. 1 can be used in the case of a heavier brake for a more powerful motor.

The function of the circuit shown in FIG. 4 is as follows. On applying the mains voltage and therefore switching on motor 21, thyristor Th is switched on, so that as a result of the small internal resistance of accelerating coil 3 compared with the entire brake magnet coil 2 a high current flows through accelerating coil 3 and this brings about a high magnetic flux and consequently a rapid application action and a short response time. Following the response or operation of the brake, high magnetic flux is no longer necessary, because the air gap between the armature and the brake magnet coil 1 is reduced and therefore the magnetic resistance is reduced. Thus, lower holding forces and consequently lower magnetic potential differences and a lower holding current are required. Thus, after response or operation, the thyristor Th is blocked by time switch 12, so that current flows across the entire brake magnet coil 2, i.e. both partial coils 3, 4, and is rectified by the oppositely directed diodes 8, 9 forming the rectifier. Due to the higher total resistance of partial coils 3, 4, there is a lower holding current, which permits a lower energy consumption and a faster disconnection.

The above-described brake can be switched in the same way as a conventional brake (FIG. 5) like that of FIG. 1, in the manner shown in FIG. 2 for additional fast disconnection by means of a freewheeling circuit connected in a high impedance manner with varistor R3.

For the rapid energizing or disconnection of the brake, countercurrent energizing can be provided, as indicated in broken line form in FIG. 4. For this purpose, a further thyristor Th' is connected in antiparallel to thyristor Th and with the thyristor Th' is associated switching time switch corresponding to electronics 12. Thyristor Th' switches the negative mains half-wave to accelerating coil 3. The voltage comes from the motor, so that a time control is not needed. Countercurrent energization leads to rapid demagnetization of the system and therefore to rapid brake application. Thyristor Th' can be turned on in an appropriate manner, e.g. by a current sensor T1 according to FIG. 3. The circuit replaces the control line and the switching contact of a direct current-side isolation arrangement, e.g. according to FIG. 2.

As stated hereinbefore, as a function of the dimensioning of the brake, in the case of a voltage drop, it may be the case that the holding force of the entire brake magnet coil (both partial coils) is no longer adequate for holding the brake, so that the brake is applied. When the voltage is restored, it must be ensured that the brake is released again and, as a function of the brake dimensioning, this may not be achievable by the brake in th case of a current flow through the entire brake magnet coil (with thyristor Th blocked). In this case, the thyristor Th must be momentarily switched on, so that there is an increased current flow through partial coil 3 which, as upon switching on, leads to the release of the brake. A specific circuit for this is shown in FIG. 4A. Monitoring circuit 13 is supplied from the mains across a dropping resistor 101 of e.g. approximately 180 K$\Omega$ and brake coil 2. The relative voltage is taken on the one hand at a capacitor 102 of 0.33 $\mu$F and on the other hand at time switch 12 with e.g. a resistor R8 of 220 K$\Omega$ and a capacitor C1 of 0.1 $\mu$F. In the case of a rise in the voltage of a half-wave, due to the voltage difference which occurs, a double transistor arrangement 103 (which can be looked upon as a thyristor) and then a FET 104 are switched in such a way that thyristor Th is initially switched on, so that only accelerating coil 3 is connected between the mains terminals. If the voltage applied is then compensated across time switch 12, then the starting pulse is removed from thyristor Th, so that the latter is blocked. If a voltage drop occurs, discharging takes place, so that on rising again there is again a voltage difference. The other elements are used for matching in the particular case.

If FET 104 is switched on, there is no signal at thyristor Th2 and accordingly thyristor Th can trigger on at the positive half wave. If FET 104 is blocked, the trigger signal is present at thyristor Th2 which makes thyristor Th2 conductive at the positive half wave and accordingly th trigger voltage is withdrawn from thyristor Th. In the case of a voltage difference at time switch 12 and capacitor 102, double transistor 103 is not switched on, FET 104, a self-conductive FET, becomes conductive, and thyristor Th can be triggered on. As the voltages at time switch 12 and capacitor 102 equalize, double transistor 103 blocks and so does FET 104 which stops the accelerating function. After the voltage difference is reduced below a given limit, double transistor 103 must switch on so that FET 104 blocks.

Similar to FIG. 2, FIG. 5 shows the circuit of a brake 42 controlled on the basis of the current of motor 21 by means of a circuit 26 according to FIG. 3 for direct current-side isolation for the high impedance switching of the freewheeling circuit. Once again, motor 21 is shown with connections L1, L2, L3 for phases R, S, T of an a.c. voltage mains and motor contactor K1 located in connections L1, L2, L3 by means of which motor 21 can be connected to the mains. From connections L2 and L3, leads 22, 23 lead to a circuit arrangement 41 which in the embodiment according to FIG. 5 is a conventional circuit. Circuit 41 shown in FIG. 5 has a rectifier with two diodes in one-way connection. For controlling the high disconnection speeds of large inductors, additional wiring with varistor R3 is provided. Upon the disconnection of motor 21 from the mains if switch 24 shunted by varistor R3 in the freewheeling circuit of the brake magnet coil of brake 42 is opened, then the freewheeling current flowing across the freewheeling diode is reduced to a value limited by varistor R3, so that the brake magnet coil permits a corresponding rapid application of brake 42. Thus, the circuit of FIG. 5 is known to the extent that it includes control circuit 41.

However, switch 24 in the freewheeling circuit of the brake magnet coil forms part of the control circuit 26 of FIG. 3 connected with its leads 31, 32 in connection L3 of motor 21, so that in this case switch 24 is inventively switched by the motor current.

The circuit according to FIG. 3 is preferably constructed as an additional device in a separate casing. The latter can be constructed by standard components, such as a conventional threaded attachment and a blind plug, so that the additional device can be fitted by screwing it into a cable bushing on the motor terminal box, so that there is no need to use a larger terminal box.

The inventive intermediate tap 6 on brake magnet coil 2 and the arrangement of the freewheeling circuit across partial coil 4 with freewheeling diode V1 makes possible, in place of the hitherto preferred d.c. side isolation, an identical result with a.c. side isolation, while involving lower costs. For this purpose a circuit 51 according to FIG. 6 is provided, whose connections 52, 53, as in the circuit according to FIG. 3, are connected in a connection L3 of motor 21. By means of outputs 54, 56, the circuit 51 is connected on the a.c. side into one of the supply lines 22, 23 of brake magnet coil (FIG. 2). Circuit 51 once against has a current transformer T11, followed by a rectifier with diodes V11, V12 and voltage limiting zener diodes V13, V14. A capacitor C10 is provided for smoothed the brief voltage drop of the alternating signal. The smoothed voltage from current transformer T11 and capacitor C10 is supplied to the control input of a triac V15, with which a varistor R11 is connected in parallel. On switching off the motor power supply across current transformer T11, the supply for brake magnet coil 2 is immediately interrupted by blocking triac V15, or is reduced by the varistor R11 to a value not adequate for holding the brake. As a result of this inventive construction, the separate lines hitherto disadvantageously necessary in the case of alternating current-side isolation are rendered superfluous.

FIGS. 7A and 7B show a construction for receiving additional circuits, particularly with current sensors, like those of FIGS. 3 and 6, without larger terminal boxes having to be provided.

Apart from its cover 62, a conventional terminal box 61 has a number of cable bushings 63 having an internal thread and closed by externally threaded blind plugs 64 when not in use. Into such a cable bushing 63 is screwed an additional casing 66 with a threaded attachment 67, which is frontally closed with a cover 68. In the represented embodiment the additional casing 66 is a reducer or extender having a blind plug screwed into the front with a interposed seal such as an O-ring (not shown). There is a clamping plate 71, a brake rectifier 72, and a clamping block 73, while the actual cabling is not shown in detail.

We claim:

1. A brake for an AC motor comprising:
    a brake magnet coil including a first partial coil connected in series with a second partial coil;
    a rectifier diode connected in series with the brake magnet coil, the series-connected brake magnet coil and rectifier diode being connected to an AC power supply for an AC motor; and
    a freewheeling circuit connected to the brake magnet coil, the freewheeling circuit including a single freewheeling diode connected in parallel with only the second partial coil;
    wherein the freewheeling circuit further includes:
    switch means connected in series with the second partial coil, the freewheeling diode being connected in parallel with only the series-connected second partial coil and switch means;
    control means for controlling the switch means such that the switch means is closed when AC power from the AC power supply is supplied to the series-connected brake magnet coil and rectifier diode, and is open when AC power from the AC power supply is not supplied to the series-connected brake magnet coil and rectifier diode; and
    an element having a high impedance relative to an impedance of the second partial coil, the high-impedance element being connected in parallel with the switch means, the parallel-connected switch means and high-impedance element being connected in series with the second partial coil.

2. A brake for an AC motor according to claim 1, wherein the brake magnet coil has an intermediate tap, and wherein the first partial coil is connected in series with the second partial coil at the intermediate tap.

3. A brake for an AC motor according to claim 1, wherein the control means includes:
    a current transformer having an input winding and an output winding, the input winding being connected between the AC power supply and the AC motor such that current flows from the AC power supply through the input winding to the AC motor when the AC motor is connected to the AC power supply, and does not flow from the AC power supply through the input winding to the AC motor when the AC motor is not connected to the AC power supply; and
    means connected to the output winding of the current transformer for closing the switch means when current flows through the input winding of the current transformer, and for opening the switch means when current does not flow through the input winding of the current transformer.

4. A brake for an AC motor according to claim 1, wherein the high-impedance element is an overvoltage protection element.

5. A brake for an AC motor according to claim 4, further comprising an overvoltage protection element connected in parallel with the rectifier diode.

6. A brake for an AC motor according to claim 1, further comprising switch means for bypassing the second partial coil for a predetermined time after AC power from the AC power supply is initially supplied to the series-connected brake magnet coil and rectifier diode such that current from the AC power supply flows through the first partial coil but does not flow through the second partial coil, thereby causing the first partial coil to operate as an accelerating coil to accelerate operation of the brake.

7. A brake for an AC motor according to claim 1, further comprising switch means connected to the first partial coil for causing a countercurrent to flow through the first partial coil when AC power from the AC power supply is removed from the series-connected brake magnet coil and rectifier diode to accelerate operation of the brake, wherein the countercurrent flows through the first partial coil in a direction which is opposite to a direction in which current from the AC power supply flows through the first partial coil when AC power from the AC power supply is supplied to the series-connected brake magnet coil and rectifier diode.

8. A brake for an AC motor according to claim 1, wherein:

the brake magnet coil has an intermediate tap;

a first terminal of the second partial coil is connected to a terminal of the first partial coil at the intermediate tap;

a first terminal of the freewheeling diode having a first polarity is connected to the first terminal of the second partial coil at the intermediate tap;

a second terminal of the freewheeling diode having a second polarity is connected to a second terminal of the second partial coil; and a terminal of the rectifier diode having the second polarity is connected to the second terminal of the freewheeling diode having the second polarity and the second terminal of the second partial coil.

9. A brake for an AC motor according to claim 1, wherein the control means includes a Schmitt trigger.

* * * * *